United States Patent
Joret et al.

(10) Patent No.: US 12,258,924 B2
(45) Date of Patent: Mar. 25, 2025

(54) THRUST REVERSER WITH DOOR OF A NACELLE OF A TURBOJET ENGINE OF AN AIRCRAFT WITH A SYSTEM FOR DIVERTING FLUIDS TO THE EXTERIOR

(71) Applicant: SAFRAN NACELLES, Gonfreville-l'Orcher (FR)

(72) Inventors: Jean-Philippe Joret, Moissy-Cramayel (FR); Jérémie Rabineau, Moissy-Cramayel (FR); Alexis Yves-Marie Loncle, Moissy-Cramayel (FR); Laurent Georges Valleroy, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 99 days.

(21) Appl. No.: 18/065,875

(22) Filed: Dec. 14, 2022

(65) Prior Publication Data
US 2023/0184193 A1   Jun. 15, 2023

(30) Foreign Application Priority Data
Dec. 15, 2021   (FR) ...................... 2113574

(51) Int. Cl.
*F02K 1/62* (2006.01)
*F02K 1/58* (2006.01)

(52) U.S. Cl.
CPC .................. *F02K 1/62* (2013.01); *F02K 1/58* (2013.01); *F05D 2220/323* (2013.01)

(58) Field of Classification Search
CPC ......... F05D 2220/323; F05D 2260/602; F02K 1/58; F02K 1/60; F02K 1/62; F02K 1/70
See application file for complete search history.

(56) References Cited

U.S. PATENT DOCUMENTS

| 5,039,171 A | * | 8/1991 | Lore ......................... F02K 1/70 |
| | | | 239/265.29 |
| 5,347,808 A | * | 9/1994 | Standish ................... F02K 1/70 |
| | | | 244/110 B |
| 5,970,704 A | | 10/1999 | Lardy et al. |
| 6,079,201 A | * | 6/2000 | Jean ........................ F02K 1/70 |
| | | | 239/265.29 |

(Continued)

OTHER PUBLICATIONS

Rapport De Recherche Préliminaire / Opinion Écrite Sur La Brevetabilité De L'Invention dated Jul. 6, 2022, issued in corresponding French Application No. 2113574, filed Dec. 15, 2021, 7 pages.

*Primary Examiner* — Anthony Ayala Delgado
(74) *Attorney, Agent, or Firm* — Christensen O'Connor Johnson Kindness PLLC

(57) ABSTRACT

A thrust reverser of a nacelle of a turbojet engine of an aircraft extending about a longitudinal axis and including a fixed structure and at least one door which is rotatable between a closed position and an open position and including a downstream frame spaced axially from a downstream end edge of the door by an axial clearance parallel to the longitudinal axis. The thrust reverser includes a system for diverting fluids to the exterior including at least one projection fixed onto the door or the other fixed structure and extending into the axial clearance and towards one of the fixed structure or the door, while leaving an axial gap between a free end of said projection and one of the fixed structure or the door.

11 Claims, 5 Drawing Sheets

(56) References Cited

U.S. PATENT DOCUMENTS

2002/0184874 A1* 12/2002 Modglin ................... F02K 1/60
  60/230
2013/0067884 A1* 3/2013 Bhatt ........................ F02K 1/72
  60/204

* cited by examiner

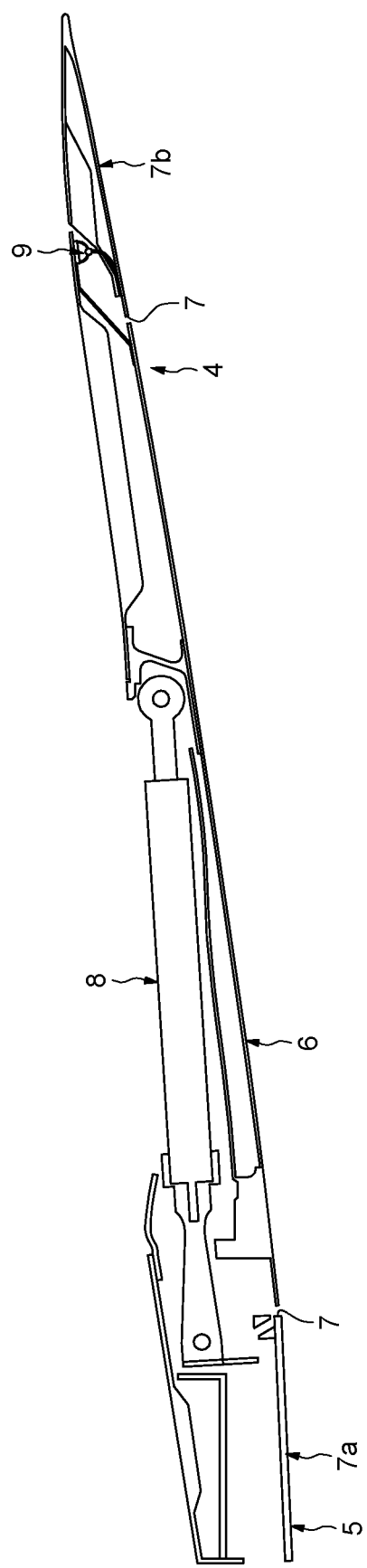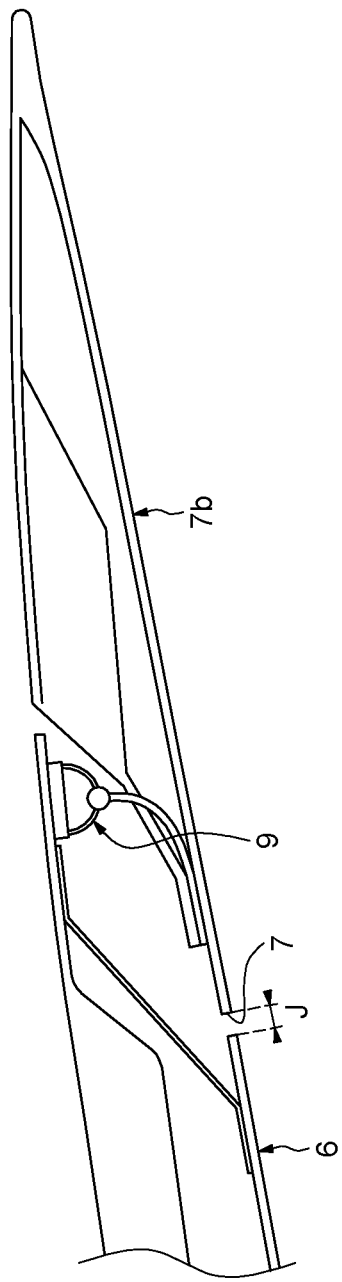

THRUST REVERSER WITH DOOR OF A NACELLE OF A TURBOJET ENGINE OF AN AIRCRAFT WITH A SYSTEM FOR DIVERTING FLUIDS TO THE EXTERIOR

CROSS-REFERENCES TO RELATED APPLICATIONS

This application claims priority to French Patent Application No. 2113574, filed Dec. 15, 2021, the entire disclosure of which is hereby incorporated by reference in its entirety.

TECHNICAL FIELD OF THE DISCLOSURE

Embodiments of the present disclosure relate to the field of aircraft, and in particular the turbojet engines of aircraft.

More particularly, the disclosure relates to thrust reversers with a door for a turbojet engine

BACKGROUND

An aircraft is propelled by one or more propulsion units each comprising a turbojet engine housed in a tubular nacelle. Each propulsion unit is attached to the aircraft by a mast generally located below or on a wing or on the fuselage of the aircraft.

As illustrated in FIGS. 1 and 2, a nacelle 1 generally has a tubular structure comprising an air intake 2 upstream of the turbojet engine, a middle section 3 intended to surround a fan of the turbojet engine, a downstream section 4 which can house thrust reversing means and is designed to surround the combustion chamber of the turbojet engine. The nacelle 1 is generally terminated by an ejection nozzle (not shown), the output of which is located downstream of the turbojet engine.

The thrust reversers are, on landing the aircraft, intended to improve the braking capacity of the aircraft by redirecting to the front at least a portion of the thrust generated by the turbojet engine. These means comprise a thrust reverser comprising one or more mobile thrust reversing elements supported by the nacelle to move between a closed position in which the thrust reverser is inactive and an open position in which the thrust reverser is active, i.e. it returns at least a portion of the gas flow generated by the turbojet engine in reverse direction to the flow guided by the nacelle. In the open position, the circulating air flow can be diverted to the exterior and upstream of the reverser, so as to exert a counter thrust contributing to the braking of the aircraft.

The downstream section 4 of the nacelle 1 therefore comprises a fixed structure 5 and a mobile structure 6.

The mobile elements 6 of the thrust reversers can be doors.

The fixed structure 5 thus comprises one or more housings 7 for receiving a door 6 each one delimited axially by an upstream frame 7a and a downstream frame 7b and transversely by two lateral beams (not shown in the FIGURES).

The actuation of the doors 6 of the thrust reversers is generally carried out by means of actuators 8, shown in FIG. 2, fixed to the fixed structure 5, in particular the upstream frame 7a, and connected on the one hand to an engine (not shown) and on the other hand to the corresponding door 6 in order to move the latter in a direction of retraction or deployment over a movement of the actuators between the closed position, shown in FIG. 1, and the open position, shown in FIG. 1A of the door 6. In the open position, the door 6 is tilted by means of the actuator 8 about an axis of rotation (not shown) between the door 6 and the fixed structure 5, in particular the downstream frame 7b.

There are clearances required for moving the door from the closed position to the open position and vice versa. These clearances are present all around the door, in particular the axial clearance J, between the door and the downstream frame 7b, shown in FIG. 2A.

As illustrated in FIGS. 2 and 2A, a circumferential seal 9 is mounted on the door 6, in particular over the entire circumferential extent of the door. There are also circumferential seals on the downstream frame 7b or even circumferential seals extending over the extent of the door 6 opposite the downstream frame 7b.

However, in the case of a leaking pipe in the turbojet engine, fluids from the turbojet engine area, in particular between the hood of the turbojet engine and the engine casing, are discharged to the exterior of the nacelle via drainage holes (not shown). During the movement of the aircraft, these leakage fluids flow along the hood 3 of turbojet engine and the downstream section 4, i.e. the thrust reverser. The leakage fluids run along the door 6 and into the clearance between the door and the downstream frame 7b of the fixed structure 5 to rise up along the lateral beams towards the upstream frame 7a. However, the area located below the upstream frame 7a comprises equipment which is not meant to be in contact with this type of fluid, with the risk of damage or even causing fire.

The circumferential seal 9 is not sufficient for guaranteeing the sealing of the area below the upstream frame 7a.

There is a need to reduce or eliminate the passage of leakage fluid between the door and the fixed structure of a thrust reverser of a nacelle of a turbojet engine.

SUMMARY

The aim of the present disclosure is therefore to overcome the aforementioned disadvantages.

The objective of the disclosure is to avoid the passage of external fluids through the axial clearance between the door and the fixed structure, in particular the downstream frame of a thrust reverser in order to avoid any contamination of the side beams and the area below the upstream frame of the fixed structure.

The subject-matter of the disclosure is a thrust reverser of a nacelle of a turbojet engine of an aircraft extending about a longitudinal axis and comprising a fixed structure and at least one door rotatable between a closed position in which the door ensures aerodynamic continuity with the fixed structure for the circulation of an air flow and an open position in which the flow of circulating air is diverted to the exterior and upstream of the thrust inverter.

The fixed structure comprises a downstream frame spaced apart axially from a downstream end edge of the door by an axial clearance parallel to the longitudinal axis.

The thrust reverser comprises a system for diverting fluid to the exterior of the thrust reverser comprising at least one projection or deflector fixed to one of the door or the fixed structure and extending into the axial clearance and towards one of the fixed structure or the door, while leaving an axial gap between a free end of the projection and one of the fixed structure or the door.

The projection extends locally into the axial clearance. In other words, the projection does not extend around the whole circumference of the end edge of the door or the upstream end of the downstream frame of the fixed structure.

The term "locally" means a projection that does not extend around the whole circumference of the upstream end of the downstream frame of the fixed structure.

The projection extends for example over an area of the circumference of the upstream end of the downstream frame of the fixed structure which is less than half the total circumference of the end, preferably over an area less than one eighth of the total circumference of the end.

The projection extends over an area of between 5 cm and 10 cm in circumferential direction, at most over an area of 5 cm.

In other words, when the projection is supported by the door, its free end is not in contact with the fixed structure, in particular the upstream end of the downstream frame, and when the projection is supported by the fixed structure, its free end is not in contact with the door.

The projection forms a deflector group. The fluid diverter system associated with the door may comprise one or more deflector groups spaced apart circumferentially from one another.

The projection acts as a local, point-like barrier, against external fluids flowing over the outer surface of the thrust reverser and is configured for modifying the direction of flow of a stream of fluids external to the thrust reverser. Thus, the external fluids can be redirected to the exterior of the thrust reverser along the downstream frame of the fixed structure.

The axial gap is smaller than the axial clearance.

The fluid diverter system is associated with the door.

The projection or deflector extends into the axial clearance between the fixed structure and the door and does not project radially to the exterior of the fixed structure, such that the projection is not arranged in the circulation flow of external fluids.

The downstream frame comprises an upstream end spaced axially from the downstream end edge of the door by the axial clearance.

Advantageously, the system for diverting fluids to the exterior of the thrust reverser comprises at least one first projection or deflector fixed to the door, in particular the downstream end edge, and extending locally into the axial clearance and towards the fixed structure, in particular the upstream end of the downstream frame, and at least one second projection or deflector fixed to the fixed structure, in particular the upstream end of the downstream frame, and extending locally into the axial clearance and towards the door in particular the downstream end edge.

The first portion and the second portion together form the deflector group.

The first portion supported by the door is not in contact with the downstream frame of the fixed structure and the second portion supported by the downstream frame is not in contact with the end edge of the door.

Thus, the first and the second portions of the fluid diverter system form a local barrier allowing external fluids to be redirected to the exterior of the thrust reverser along the downstream frame of the fixed structure.

The first projection and the second projection each extend locally into the axial clearance. In other words, the first projection attached to the door does not extend around the whole circumference of the end edge of the door and the second projection attached to the fixed structure does not extend around the whole circumference of the upstream end of the downstream frame of the fixed structure.

According to one embodiment, the first projection and the second projection of the system for diverting external fluids are in local and direct radial and/or circumferential contact with one another.

In other words, the first portion bears directly radially and/or circumferentially on the second portion. The direct contact, i.e. without an intermediate element, between the two portions of the flow diverter system allows for improved diversion of external fluids.

For example, one of the first portion or the second portion is made from an elastic material capable of being deformed elastically under application of an external stress and returning to its original shape once the external stress has stopped.

In other words, either the first portion supported by the door is made from an elastic material and the second portion supported by the fixed structure is made from a more rigid material than the first portion, or the second portion supported by the fixed structure is made from an elastic material and the first portion supported by the door is made from a more rigid material than the second portion.

The projection made from a more rigid material than the other portion may be normal or parallel to the attachment surface. The projection made from a more flexible material then presses against the the more rigid portion.

For example, when the first portion bears radially and/or circumferentially on the second portion, the deflecting portion of the first projection is substantially inclined at an angle of between 90° and 180° relative to the attachment portion.

According to one embodiment, one of the first portion or the second portion is a seal made from a more flexible material than one of the second portion or the first portion.

The more flexible portion can be made from a polymeric material, such as for example silicone. Alternatively, it could be provided that the more flexible portion is made in the form of a metal leaf spring.

The more rigid portion can be made from a rigid material, such as a metal material, a composite material, a plastic material. The term "rigid" means a material which is not elastically deformable under the action of an applied stress.

Alternatively, the first portion and the second portion can each be made from an elastic material capable of being deformed elastically under external stress and returning to its initial shape once the external stress has stopped.

According to another embodiment, the first projection and the second projection are spaced apart circumferentially from one another by a circumferential clearance.

In other words, the first and the second portion of the fluid diverter system are offset at an angle and are not in contact with one another. The circumferential clearance makes it possible to allow for manufacturing and installation tolerances of the door and the fixed structure, as well as displacements during aircraft flight.

Advantageously, the first projection comprises an attachment portion fixed to the downstream end edge of the door and a deflecting portion extending from an outer surface of the attachment portion to the exterior.

For example, when the first projection and the second projection are spaced apart circumferentially from one another by a circumferential clearance, the deflecting portion of the first projection is substantially inclined at an angle between 90° and 150°, for example equal to 135°, relative to the attachment portion.

Advantageously, the second projection comprises an attachment portion fixed to the upstream end of the downstream frame of the fixed structure and a deflecting portion extending from an outer surface of the attachment portion to the exterior.

For example, the deflecting portion of the second projection is inclined at an angle of between 90° and 150°, for example equal to 90° relative to the attachment portion.

According to one embodiment, the deflector group of the fluid diverter system associated with the door comprises a number of first projections greater than or equal to two and a number of second projections greater than or equal to two, the number of first projections being equal to or different from the number of second projections.

In the case of a plurality of first and second portions, the first and second portions can be alternated. It is also possible to provide a succession of first portions without alternating with second portions.

For example, each of the first and second portions of the external fluid diverter system is made from a rigid material, such as a metal material, a composite material, a plastic material.

According to one embodiment, the fluid diverter system comprises at least two deflector groups spaced apart circumferentially from one another.

According to one embodiment, the thrust reverser comprises a first fluid diverter system associated with the door and comprising at least one first deflector group comprising the first projection and the second projection spaced apart circumferentially from the first projection by a circumferential clearance and a second fluid diverter system associated with the door and comprising at least one second deflector group comprising the first projection and the second projection in direct local radial contact and/or circumferential contact with the first projection.

According to one embodiment, the thrust reverser comprises a circumferential seal attached to the door and separate from the fluid diverter system.

The term "rigid" means a material which is not elastically deformable under the action of an applied stress.

According to another aspect, the disclosure relates to a nacelle of a turbojet engine of an aircraft comprising a thrust reverser with a door as described above.

DESCRIPTION OF THE DRAWINGS

Further aims, features and advantages of the disclosure will become apparent from reading the following description, given solely by way of a non-limiting example, with reference to the accompanying drawings in which:

FIG. 2 is a detailed cross-sectional view of the nacelle of FIG. 1;

FIG. 2A is a detailed view of FIG. 2;

DETAILED DESCRIPTION

In the following description, the terms "upstream" and "downstream" are defined with respect to the direction of airflow in the turbomachine.

The terms "axial" and "radial" are defined relative to a longitudinal extension axis A of the thrust reverser 10.

Figure 1:
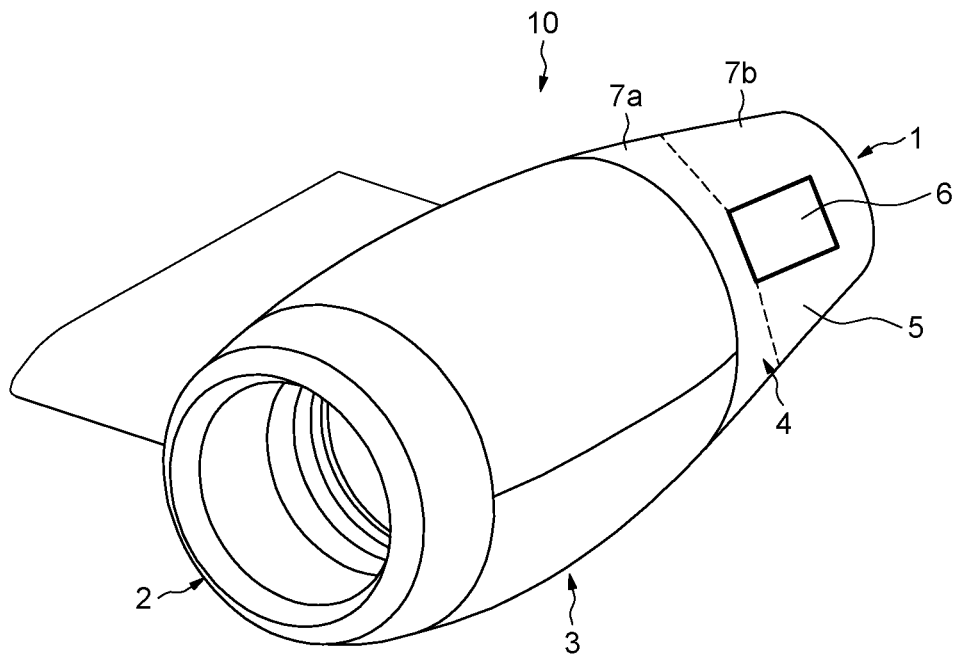
FIG. 1 is a schematic view of a nacelle for a turbojet engine of an aircraft comprising a thrust reverser with a door in a closed position according to the prior art.
Figure 1A:
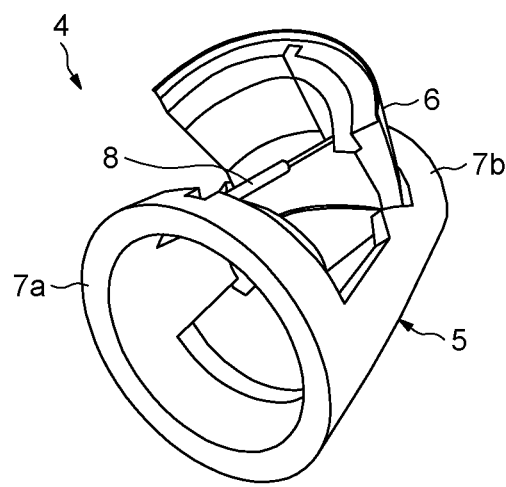
FIG. 1A is a detailed view of FIG. 1, in which the thrust reverser with a door is in an open position.
Figure 3:
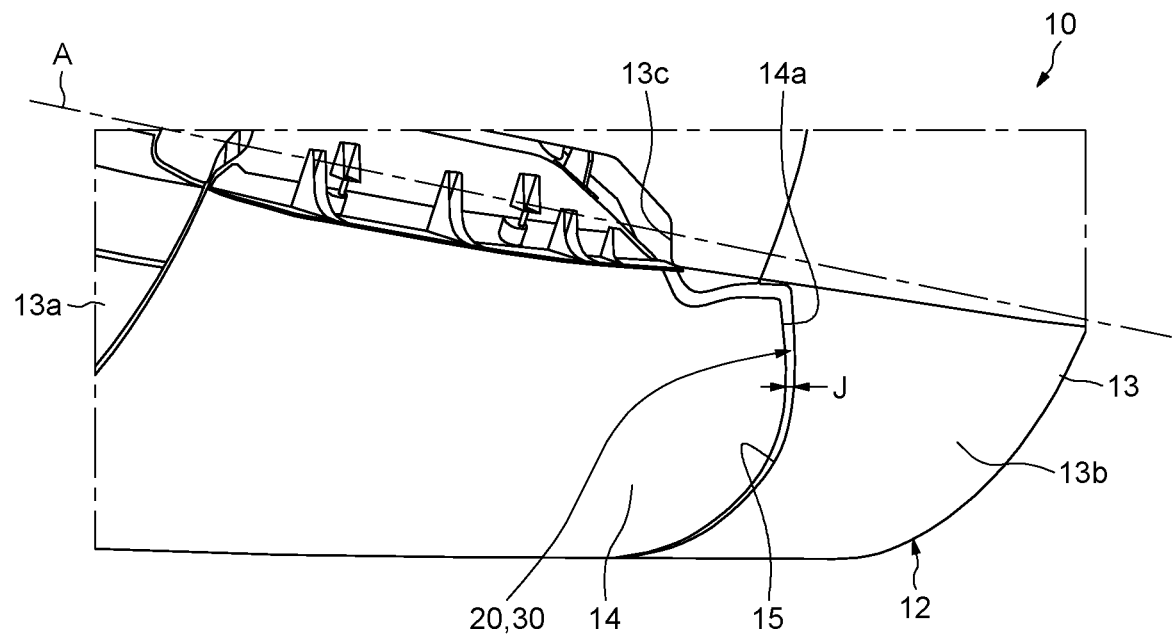
FIG. 3 is a schematic view of a thrust reverser with a door of a nacelle of a turbojet.t engine of an aircraft according to the disclosure.

FIG. 3 shows very schematically a thrust reverser 10 with a door of a nacelle of a turbojet engine of an aircraft (not shown).

The thrust reverser 10 extends along a longitudinal axis A corresponding to a longitudinal axis of the nacelle (not shown). The thrust reverser 10 corresponds to the downstream section of the nacelle.

The thrust reverser 10 comprises a fixed structure 12 and a door 14 which is rotatable about an axis transverse to the longitudinal axis, between a closed position, shown in FIG. 3, in which it provides aerodynamic continuity with the fixed structure 12 of the reverser and with the nacelle and an open position (not shown), in which the door 14 allows the air flow to be diverted to the exterior and upstream of the reverser 10.

The door 14 is pivotably mounted about an axis by means of an actuator. The actuation of the door is known and will not be described further.

The fixed structure 12 comprises here a housing 13 for receiving the door 14 delimited axially by an upstream frame 13a and a downstream frame 13b and transversely by two lateral beams 13c, only one of which is shown in FIG. 3. Alternatively, it could be provided that the fixed structure 12 comprises a different number of housings for receiving the door, for example greater than or equal to two.

The downstream frame 13b is spaced apart axially from a downstream end edge of the door 14 by an axial clearance J.

The thrust reverser 10 further comprises a system 20 for diverting fluids to the exterior of the thrust reverser 10.

Figure 4:
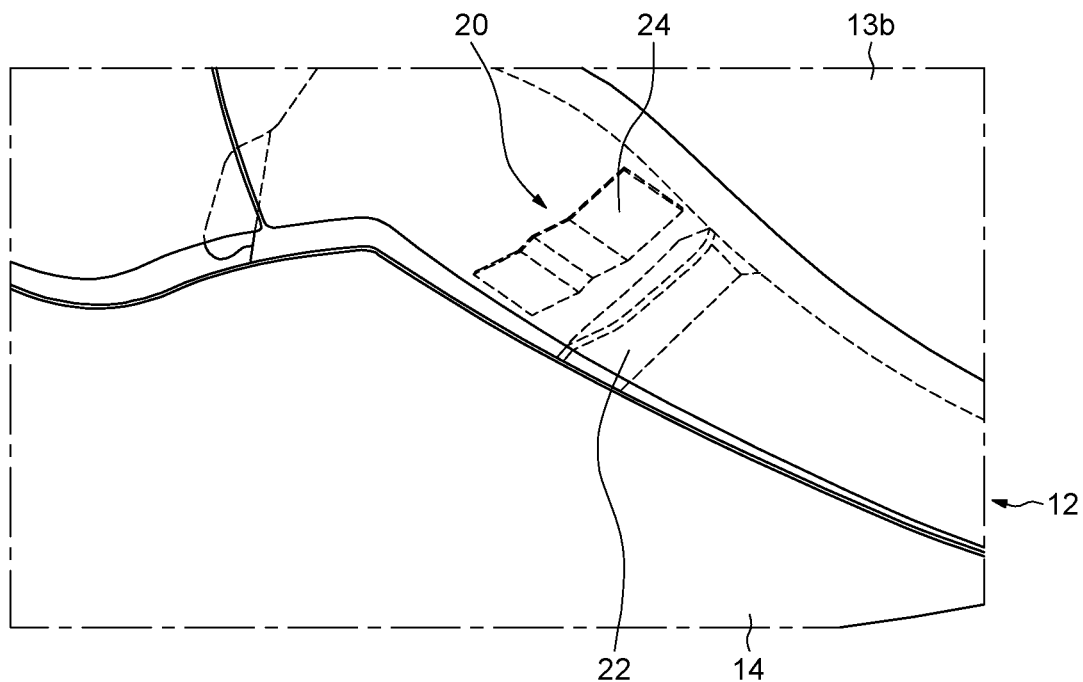
FIGS. 4-6 are detailed views of a fluid diverter system of the thrust reverser of FIG. 3 according to one embodiment of the disclosure.
Figure 5:
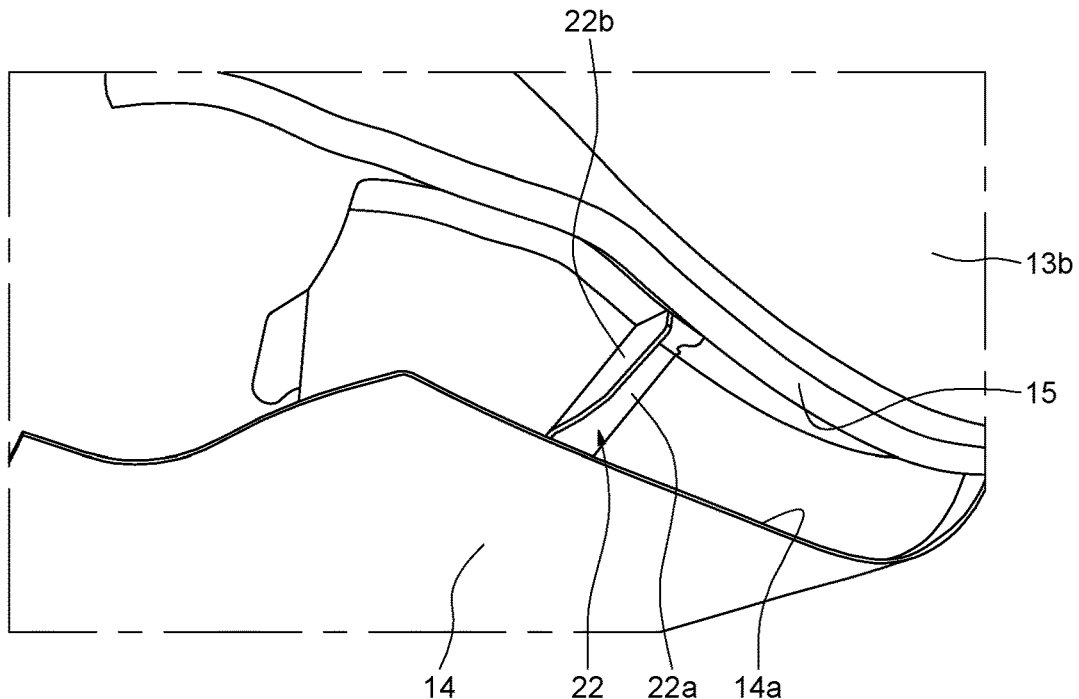
Figure 6:
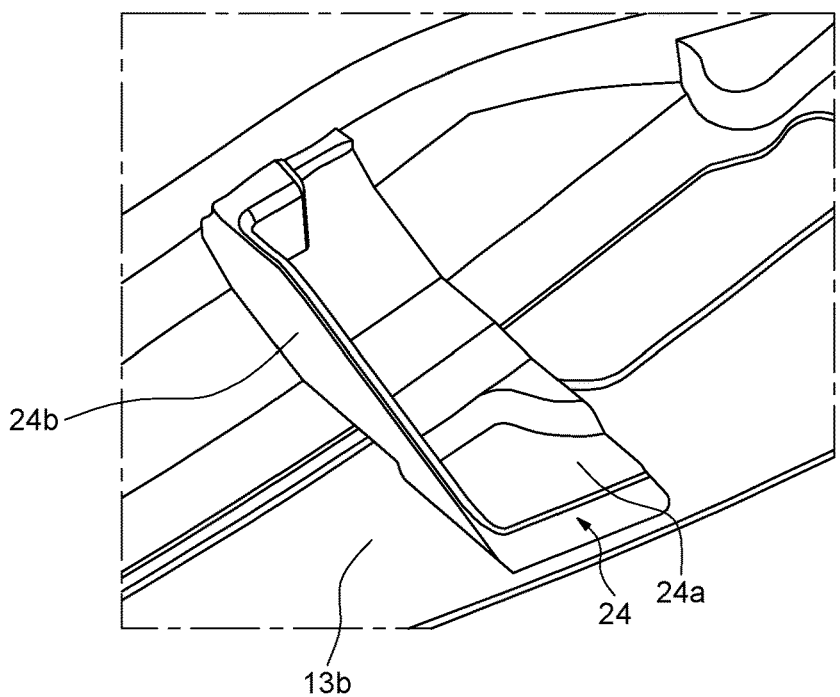

An example of the fluid diverter system 20 is illustrated in detail in FIGS. 4 to 6. In this example, the fluid diverter system 20 comprises a first portion 22 connected to the door 14 and extending axially into axial clearance J and towards the downstream frame 13b of the fixed structure 12 of the thrust reverser 10.

An axial gap (not referenced) is left between a free end of the first portion 22 and an upstream end 15 of the downstream frame 13b of the fixed structure 12. The axial gap is smaller than the axial clearance.

As illustrated in FIG. 5, the first portion 22 comprises an attachment portion 22a fixed to the downstream end edge 14a of the door and a diverting portion 22b extending from an outer surface of the attachment portion 22a to the exterior. The diverting portion 22b is here substantially inclined at an angle of between 90° and 150°, for example equal to 135° relative to the attachment portion 22a.

The fluid diverter system 20 further comprises a second portion 24 connected to the fixed structure 12 and extending axially into the axial clearance J from the upstream end 15 of the downstream frame 13b and towards the downstream end edge 14a of the door 14 of the thrust reverser 10.

An axial gap (not referenced) is left between a free end of the second portion 24 and the downstream end edge 14a of the door 14. The axial gap is smaller than the axial clearance.

As illustrated in FIG. 6, the second portion 24 comprises an attachment portion 24a fixed to the upstream end 15 of the downstream frame 13b of the fixed structure 12 and a diverting portion 24b extending from an outer surface of the attachment portion 24a to the exterior. The deflecting portion 24b is here inclined at an angle of between 90° and 150°, for example equal to 90° relative to the attachment portion 24a.

The first and second portions 22, 24 are deflectors configured to change the direction of flow of a stream of fluids external to the thrust reverser.

The first portion 22 supported by the door 14 is not in contact with the downstream frame 13b of the fixed structure 12 and the second portion 24 supported by the downstream frame 13b is not in contact with the end edge 14a of the door 14.

The first and the second portions 22, 24 are here spaced apart circumferentially from one another by a circumferential clearance.

In other words, the first and the second portions 22, 24 of the fluid diverter system 20 are not in contact with one another. The circumferential clearance makes it possible to allow for manufacturing and installation tolerances of the door and the fixed structure, as well as displacements during aircraft flight.

The first and the second projections 22, 24 of the fluid diverter system 20 each extend locally into the axial clearance J. In other words, the first projection 22 attached to the door does not extend around the whole circumference of the end edge 14a of the door 14 and the second projection 24 attached to the fixed structure does not extend around the whole circumference of the upstream end 15 of the downstream frame 13b of the fixed structure 12.

Thus, the first and the second portions 22, 24 of the fluid diverter system 20 form a local barrier allowing external fluids to be redirected to the exterior of the thrust reverser 10 to pass along the downstream frame 13b of the fixed structure 12.

As illustrated, the fluid diverter system 20 comprises a first portion 22 and a second portion 24, forming a deflector group. Alternatively, a different number of first and second portions 22, 24 of the fluid diverter system could be provided. It could also be provided that the number of first portions 22 is different from the number of second portions 24. In the case of a plurality of first and second portions, the first and second portions can be alternated. It is also possible to provide a succession of first portions without alternating with second portions.

It could also be provided that the fluid diverter system 20 comprises a plurality of deflector groups spaced apart circumferentially from one another.

It could also be provided that the fluid diverter system 20 comprises a single projection forming a deflector group and extending into the axial clearance from either the door 14 or the fixed structure 12 towards the other fixed structure 12 or the door 14.

The first portion 22 and second portion 24 can be made from a rigid material, such as a metal material, a composite material, a plastic material. The term "rigid" means a material which is not elastically deformable under the action of an applied stress.

Figure 7:
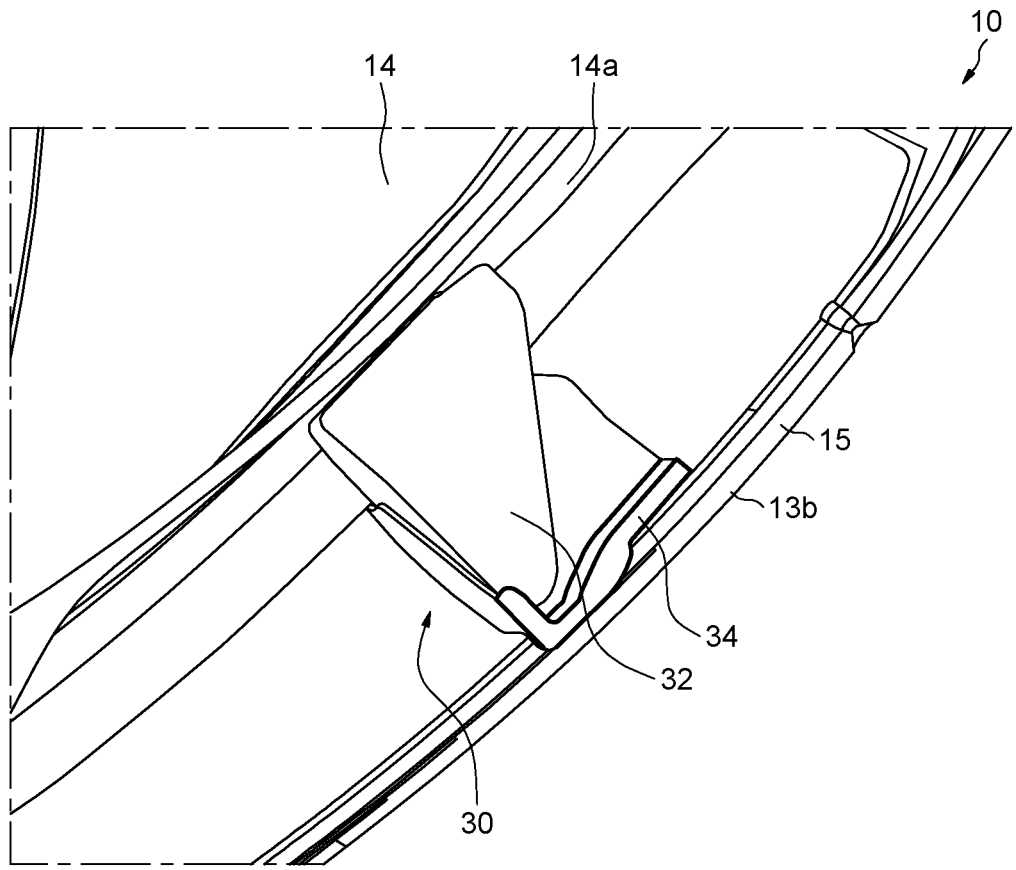
FIGS. 7 and 8 are detailed views of a fluid diverter system of the thrust reverser of FIG. 3 according to another embodiment of the disclosure.
Figure 8:
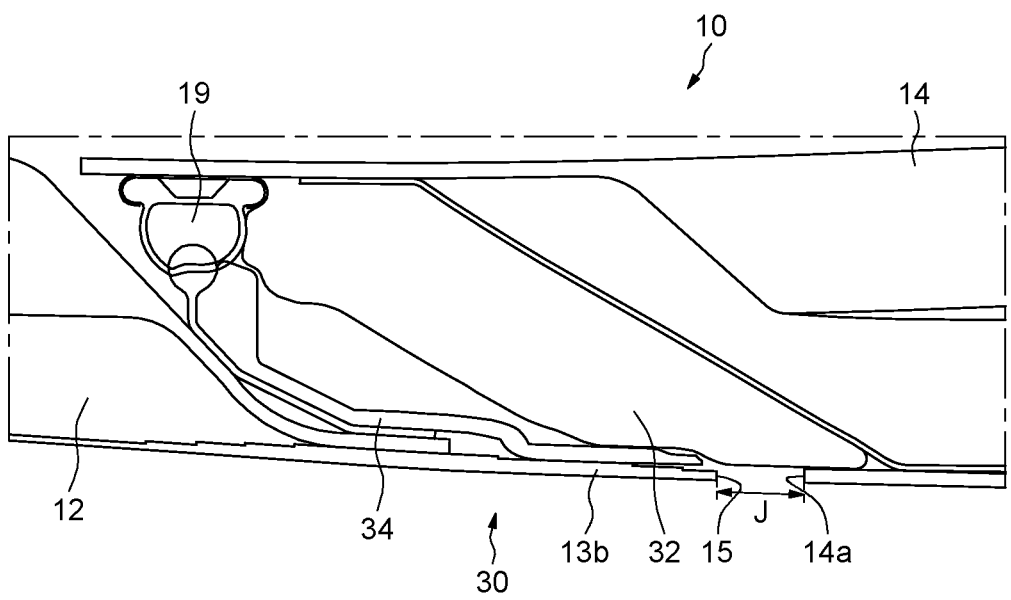

The embodiment illustrated in FIGS. 7 and 8, in which the same elements have the same reference numbers, differs from the embodiment illustrated in FIGS. 4 to 6 only in the system for diverting external fluids.

As illustrated in detail in FIGS. 7 and 8, the fluid diverter system 30 comprises a first portion 32 connected to the door 14 and extending axially locally into the axial clearance J and towards the downstream frame 13b of the fixed structure 12 of the thrust reverser 10.

An axial gap (not referenced) is left between a free end of the first portion 32 and the downstream frame 13b of the fixed structure 12. The axial gap is smaller than the axial clearance.

As illustrated, the first projection 32 is fixed to the downstream end edge 14a of the door 14.

The fluid diverter system 30 further comprises a second portion 34 connected to the fixed structure 12, in particular fixed to the upstream end 15 of the downstream frame 13b of the fixed structure 12 and extending axially locally into the axial clearance J and towards the downstream end edge 14a of the door 14 of the thrust reverser 10.

An axial gap (not referenced) is left between a free end of the second portion 34 and the downstream end edge 14a of the door 14. The axial gap is smaller than the axial clearance.

As illustrated, the first and the second projections 32, 34 are in point-like and direct radial contact with one another, forming a local seal between the door 14 and the downstream frame 13b. In other words, the first portion 32 is in radial abutment with the second portion 34. The contacts between the first portion 32 and the second portion 34 are shown in detail in FIG. 8. Thus, it is observed that the first portion 32 and the second portion 34 are in contact along two contact areas (not referenced).

In other words, the first projection 32 fixed to the door 14 does not extend around the whole circumference of the end edge 14a of the door 14 and the second projection 34 fixed to the fixed structure 12 does not extend around the whole circumference of the upstream end 15 of the downstream frame 13b of the fixed structure 12.

The term "direct contact" is defined as a contact without an intermediate element between two elements.

Thus, the first and the second projections 32, 34 of the fluid diverter system 30 form a local and point-like barrier allowing external fluids to be redirected to the exterior of the thrust reverser 10 to flow along the downstream frame 13b of the fixed structure 12.

In this example, the first and second projections 32, 34 are also deflectors configured to modify the flow direction of a stream of fluids external to the thrust reverser.

Alternatively, it is possible that the first and the second projections 32, 34 are in circumferential contact with one another, or that first and the second projections 32, 34 are in circumferential and radial contact with one another.

The first portion 32 may be a seal made from a more flexible material than the second portion 34. For example, the first portion 32 is made from a polymeric material such as silicone for example. Alternatively, it is possible that the first portion 32 is made in the form of a metal leaf spring. In general, the first portion 32 is made from an elastic material capable of being deformed elastically with the application of external stress and returning to its initial shape once the external stress has stopped.

The second portion 34 can be made from a rigid material, such as a metal material, a composite material or a plastic material. The term "rigid" means a material which is not elastically deformable under the action of an applied stress.

Alternatively, the first portion 32 supported by the door 14 could be more rigid than the second portion 34 supported by the fixed structure 12.

Alternatively, the first portion 32 and the second portion 34 can each be made from an elastic material capable of being elastically deformed during the application of external stress and returning to its initial shape once the external stress has stopped.

As shown, the fluid diverter system 30 comprises a first portion 32 and a second portion 34 together forming a deflector group. Alternatively, a different number of first and second portions 32, 34 of the fluid diverter system could be provided. Each deflector group comprising a first and a second portion are spaced apart circumferentially from one another.

It is also possible to combine a first fluid diverter system 20 described with reference to FIGS. 4 to 6 with a second fluid diverter system 30 described with reference to FIGS. 7 and 8, the first device 20 and the second device 30 being spaced apart circumferentially from one another.

In a manner that is in no way limiting, the thrust reverser 10 also comprises a circumferential seal 19 shown in FIG. 8 extending circumferentially around the door 14. The circumferential seal 19 is separate from the systems 20, 30 for diverting fluids.

In all of the described embodiments, the fluid diverter system 20, 30 is advantageously arranged in the axial clearance between the door 14 and the fixed structure 12 closest to the mast or fuselage of the aircraft on which the thrust reverser 10 is to be mounted.

Due to the disclosure, it is possible to effectively divert the external fluids circulating around the door to the exterior of the thrust reverser and thus to prevent these external fluids from entering the clearance between the downstream end edge of the door and the downstream frame of the fixed structure of the thrust reverser.

The invention claimed is:

1. A thrust reverser of a nacelle of a turbojet engine of an aircraft extending about a longitudinal axis, comprising:
    a fixed structure and at least one door rotatable between a closed position in which said door provides aerodynamic continuity with the fixed structure for the circulation of an air flow and an open position in which the circulating air flow is diverted to the exterior and upstream of the thrust reverser, the fixed structure comprising a downstream frame comprising an upstream end spaced axially from a downstream end edge of the door by an axial clearance parallel to the longitudinal axis;
    at least one fluid diverter system for diverting fluids to the exterior of the thrust reverser associated with the door, wherein the fluid diverter system comprises at least one deflector group comprising at least one projection fixed onto one of the door or the fixed structure and extending locally from one of downstream end edge of the door or the upstream end of the downstream frame in the axial clearance and towards one of the upstream end of the downstream frame or the downstream end edge of the door, while leaving an axial gap between a free end of said projection and one of the upstream end of the downstream frame of the fixed structure or the downstream end edge of the door, and wherein the at least one projection includes at least one first projection fixed to the downstream end edge of the door and extending locally into the axial clearance and towards the upstream end of the downstream frame of the fixed structure and at least one second projection fixed to the upstream end of the downstream frame of the fixed structure and extending locally into the axial clearance and towards the downstream end edge of the door.

2. The thrust reverser according to claim 1, wherein the at least one first projection and the at least one second projection are in local direct radial and/or circumferential contact with one another.

3. The thrust reverser according to claim 2, wherein one of the at least one first projection or at least one the second projection is made from an elastic material capable of being deformed elastically on application of external stress and being restored to its initial form once the external stress has stopped.

4. The thrust reverser according to claim 3, wherein one of the at least one first projection or at least one the second projection is a seal made from a material that is more flexible than the other one of the at least one second projection or the at least one first projection.

5. The thrust reverser according to claim 1, wherein the at least one first projection and the at least one second projection are spaced apart circumferentially from one another by a circumferential clearance.

6. The thrust reverser according to claim 5, wherein the at least one first projection comprises an attachment portion fixed to the downstream end edge of the door and a diverting portion extending from an outer surface of the attachment portion to the exterior.

7. The thrust reverser according to claim 5, wherein the at least one second projection comprises an attachment portion fixed to the upstream end of the downstream frame of the fixed structure and a diverting portion extending from an outer surface of the attachment portion to the exterior.

8. The thrust reverser according to claim 1, wherein the number of first projections is greater than or equal to two and a number of second projections is greater than or equal to two, the number of first projections being different from the number of second projections.

9. The thrust reverser according to claim 1, wherein the at least one deflector group of the fluid diverter system comprises at least two deflector groups circumferentially spaced apart from each other.

10. The thrust reverser according to claim 1, wherein the at least one fluid diverter system includes a first fluid diverter system comprising at least one first deflector group comprising the first projection and the second projection spaced apart circumferentially from the first projection by a circumferential clearance and a second fluid diverter system comprising at least one second deflector group comprising the first projection and the second projection in local direct radial and/or circumferential contact with the first projection.

11. A nacelle of a turbojet engine of an aircraft comprising a thrust reverser with a door according to claim 1.

* * * * *